United States Patent
Kim et al.

(10) Patent No.: US 10,726,997 B2
(45) Date of Patent: Jul. 28, 2020

(54) MULTILAYER CAPACITOR AND METHOD FOR MANUFACTURING THE SAME

(71) Applicant: SAMSUNG ELECTRO-MECHANICS CO., LTD., Suwon-si, Gyeonggi-do (KR)

(72) Inventors: Young Wook Kim, Suwon-si (KR); Sung Min Cho, Suwon-si (KR); Seung Mo Lim, Suwon-si (KR); Jung Min Kim, Suwon-si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/818,413

(22) Filed: Nov. 20, 2017

(65) Prior Publication Data

US 2018/0286591 A1    Oct. 4, 2018

(30) Foreign Application Priority Data

Mar. 29, 2017 (KR) .................. 10-2017-0040000

(51) Int. Cl.
*H01G 4/30* (2006.01)
*H01G 4/224* (2006.01)
(Continued)

(52) U.S. Cl.
CPC .............. *H01G 4/30* (2013.01); *H01G 4/12* (2013.01); *H01G 4/224* (2013.01); *H01G 4/232* (2013.01); *H01G 4/085* (2013.01); *H01G 4/1227* (2013.01)

(58) Field of Classification Search
CPC ................................. H01G 4/30; H01G 4/224
(Continued)

(56) References Cited

U.S. PATENT DOCUMENTS 3,237,066 A * 2/1966 Martin ................ H01G 4/0085
252/514
6,980,413 B1  12/2005 Kim et al.
(Continued)

FOREIGN PATENT DOCUMENTS

CN       201196910 Y    2/2009
CN       102568822 A    7/2012
(Continued)

OTHER PUBLICATIONS

Office Action issued in corresponding Korean Patent Application No. 10-2017-0040000, dated Jun. 4, 2018.
(Continued)

*Primary Examiner* — Eric W Thomas
(74) *Attorney, Agent, or Firm* — Morgan, Lewis & Bockius LLP

(57) ABSTRACT

A multilayer capacitor includes a capacitor body having a first surface and a second surface opposing each other, and a third surface and a fourth surface opposing each other while being connected to the first surface and the second surface. The multilayer capacitor includes dielectric layers, and a first internal electrode and a second internal electrode disposed alternately with the dielectric layers interposed therebetween and being exposed to the first and second surfaces, respectively; and an amorphous dielectric film disposed on at least the third and fourth surfaces of the capacitor body. The amorphous dielectric film may be in direct contact with the first and second internal electrodes.

8 Claims, 8 Drawing Sheets

(51) Int. Cl.
*H01G 4/12* (2006.01)
*H01G 4/232* (2006.01)
*H01G 4/08* (2006.01)

(58) Field of Classification Search
USPC ............................................................ 361/301.4
See application file for complete search history.

(56) References Cited

U.S. PATENT DOCUMENTS

| | | | |
|---|---|---|---|
| 2006/0139848 A1* | 6/2006 | Kim | H01G 4/012 |
| | | | 361/306.3 |
| 2010/0025075 A1* | 2/2010 | Feichtinger | H01C 1/142 |
| | | | 174/126.1 |
| 2012/0154978 A1 | 6/2012 | Kim | |
| 2012/0229949 A1 | 9/2012 | Kim | |
| 2013/0208398 A1 | 8/2013 | Tanaka et al. | |
| 2013/0258548 A1* | 10/2013 | Mizuno | H01G 4/1227 |
| | | | 361/301.4 |
| 2016/0064473 A1 | 3/2016 | Morito et al. | |
| 2016/0351335 A1 | 12/2016 | Kato et al. | |
| 2016/0381802 A1* | 12/2016 | Taniguchi | H01G 4/008 |
| | | | 174/260 |
| 2017/0076864 A1 | 3/2017 | Okai et al. | |
| 2017/0323727 A1* | 11/2017 | Mukoyama | H01G 4/30 |

FOREIGN PATENT DOCUMENTS

| | | | |
|---|---|---|---|
| CN | 102683015 A | | 9/2012 |
| CN | 105390286 A | | 3/2016 |
| JP | 08111349 A | * | 4/1996 |
| JP | 2009-032833 A | | 2/2009 |
| JP | 2012174916 A | * | 9/2012 |
| JP | 2013-165210 A | | 8/2013 |
| KR | 100204255 B1 | | 6/1999 |
| KR | 100568306 B1 | | 4/2006 |
| KR | 10-2016-0106026 | | 9/2016 |
| KR | 10-2016-0140449 A | | 12/2016 |

OTHER PUBLICATIONS

Office Action issued in corresponding Chinese Application No. 201810038983.6, dated Jul. 18, 2019.
Second Office Action issued in Chinese Application No. 201810038983.6, dated Jun. 12, 2020 (with English Translation).

* cited by examiner

A-A'

B-B'

MULTILAYER CAPACITOR AND METHOD FOR MANUFACTURING THE SAME

CROSS-REFERENCE TO RELATED APPLICATION

This application claims the benefit of priority to Korean Patent Application No. 10-2017-0040000 filed on Mar. 29, 2017 with the Korean Intellectual Property Office, the entirety of which is incorporated herein by reference.

TECHNICAL FIELD

The present disclosure relates to a multilayer capacitor and a method for manufacturing the same.

BACKGROUND

Multilayer capacitors have been widely used as components in mobile communications devices such as laptop computers, personal digital assistants (PDAs), mobile phones, and the like, due to advantages thereof such as small size, high capacitance, ease of mounting, or the like.

In recent years, with the miniaturization and multifunctionalization of electronic products, increasing an effective volume ratio, the ratio of volume contributing to capacity to the overall volume of the multilayer capacitor, has become a major challenge in the field of multilayer capacitors.

As related art regarding increasing the effective volume ratio, there has been developed a technology of cutting off a lateral portion of a capacitor body, formed by stacking dielectric layers, to expose an internal electrode to a cut surface of the capacitor body, transferring a dielectric sheet to the cut surface, and sintering the dielectric sheet.

However, such a sheet transfer method may include a large number of processes added to form dielectric sheets on opposing side surfaces of a capacitor body, while applying a significant amount of pressure to the capacitor body in a multilayer capacitor manufacturing process, to cause work defects during the process, thereby reducing mass productivity and causing difficulties in preventing variations in quality. Furthermore, in the case of the sheet transfer method, because a dielectric sheet is subjected to a sintering process after being transferred, a dielectric layer and the dielectric sheet need to be formed of the same dielectric. Accordingly, it has been difficult to increase capacity in capacitors and ensure moisture resistance reliability simultaneously.

SUMMARY

An aspect of the present disclosure may provide a high-capacity multilayer capacitor having excellent moisture resistance reliability, and a method for manufacturing the same.

According to an aspect of the present disclosure, a multilayer capacitor may include: a capacitor body having a first surface and a second surface opposing each other, and a third surface and a fourth surface opposing each other while being connected to the first surface and the second surface, and including dielectric layers, and a first internal electrode and a second internal electrode disposed alternately with the dielectric layers interposed therebetween and being exposed to the first and second surfaces, respectively; and an amorphous dielectric film formed on at least the third and fourth surfaces of the capacitor body, the amorphous dielectric film being in direct contact with the first and second internal electrodes.

A method for manufacturing a multilayer capacitor may include: providing a first ceramic green sheet having a plurality of stripe-type first internal electrode patterns formed at predetermined intervals, and a second ceramic green sheet having a plurality of stripe-type second internal electrode patterns formed at predetermined intervals; forming a ceramic green sheet laminate by stacking the first ceramic green sheet and the second ceramic green sheet such that the stripe-type first internal electrode patterns and the stripe-type second internal electrode patterns alternate with each other; obtaining a bar-type laminate by cutting the ceramic green sheet laminate in a width direction perpendicular to a formation direction of the first and second internal electrode patterns, the bar-type laminate including a plurality of first and second internal electrodes each having a predetermined width, and the bar-type laminate having third and fourth surfaces exposed in the width direction; obtaining a separate laminate by cutting the bar-type laminate in a direction parallel to the formation direction of the first and second internal electrode patterns, the separate laminate including first and second surfaces to which one ends of the first and second internal electrodes are exposed, respectively; obtaining a capacitor body by sintering the separate laminate; and forming amorphous dielectric films on first and second surfaces of the capacitor body.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
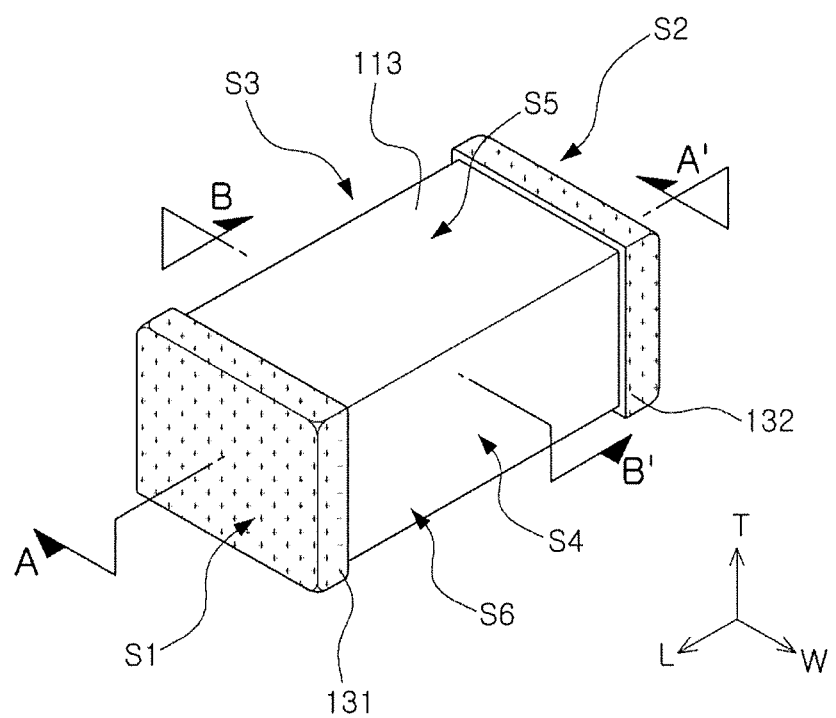
FIG. 1 is a schematic perspective view of a multilayer capacitor according to an exemplary embodiment.

Hereinafter, embodiments of the present disclosure will be described with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element, or other elements intervening therebetween may be present. In contrast, when an element is referred to as being "directly on," "directly connected to," or "directly coupled to" another element, there may be no other elements or layers intervening therebetween. Like numerals refer to like elements throughout. As used herein, the term "and/or" includes any and all combinations of one or more of the associated, listed items.

It will be apparent that, although the terms 'first,' 'second,' 'third,' etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" or the like, may be used herein for ease of description to describe one element's relationship relative to another element(s), as shown in the figures. It will be understood that spatially relative terms are intended to encompass different orientations of the device in use or operation, in addition to the orientation depicted in the figures. For example, if the device in the figures is turned over, elements described as "above," or "upper" relative to other elements would then be oriented "below," or "lower" relative to the other elements or features. Thus, the term "above" can encompass both the above and below orientations, depending on a particular directional orientation of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present disclosure will be described with reference to schematic views illustrating embodiments of the present disclosure. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape resulting from manufacturing. The following embodiments may also be constituted alone or as a combination of several or all thereof.

The contents of the present disclosure described below may have a variety of configurations, and only a required configuration is proposed herein, but the present disclosure is not limited thereto.

Figure 2:
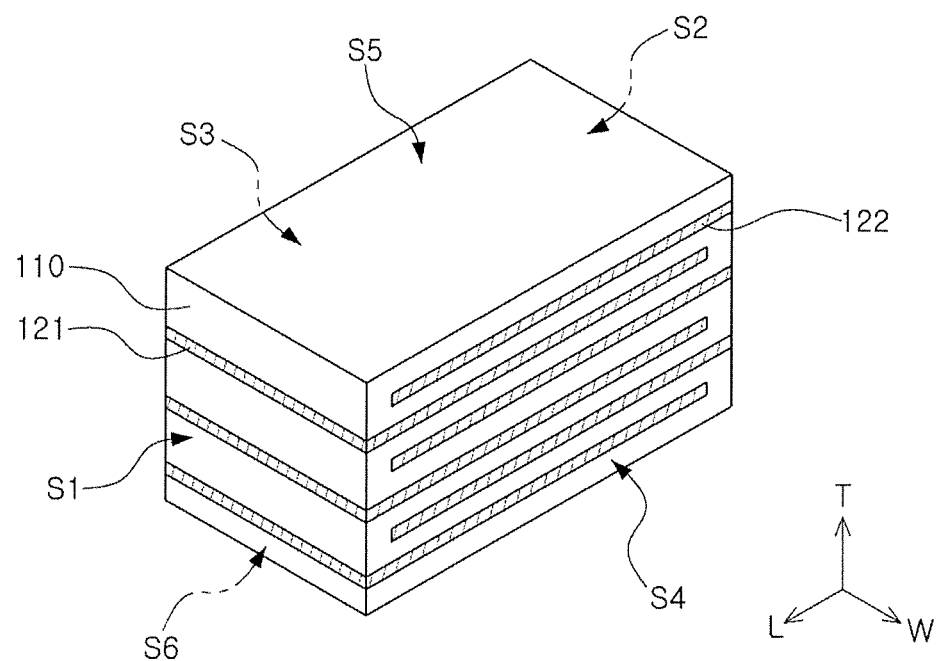
FIG. 2 is a schematic perspective view of a capacitor body of FIG. 1 from which first and second external electrodes and an amorphous dielectric film are removed.
Figure 3:
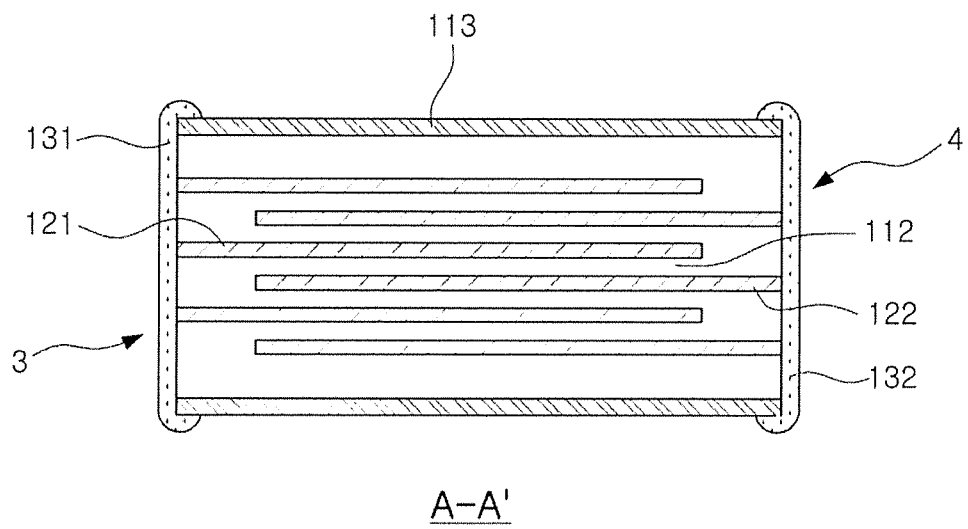
FIG. 3 is a cross-sectional view taken along line A-A' of FIG. 1.
Figure 4:
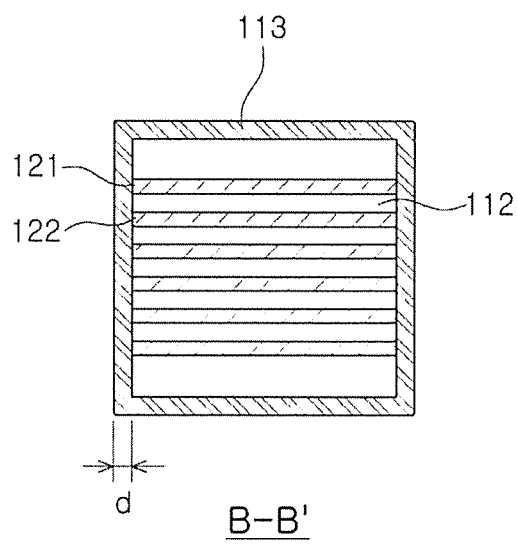
FIG. 4 is a cross-sectional view taken along line B-B' of FIG. 1.

FIG. 1 is a schematic perspective view of a multilayer capacitor according to an exemplary embodiment. FIG. 2 is a schematic perspective view of a capacitor body of FIG. 1 from which first and second external electrodes and an amorphous dielectric film is removed. FIG. 3 is a cross-sectional view taken along line A-A' of FIG. 1. FIG. 4 is a cross-sectional view taken along line B-B' of FIG. 1.

In the following description described with reference to FIG. 1, a 'length' direction may be defined as an 'L' direction of FIG. 1, a 'width' direction may be defined as a 'W' direction of FIG. 1, and a 'thickness' direction may be defined as a 'T' direction of FIG. 1. The 'thickness' direction may be the same as a direction in which a dielectric layer and an electrode layer are stacked, that is, a 'stacking' direction.

An example of a multilayer capacitor, according to an exemplary embodiment, will be detailed hereinafter with reference to FIGS. 1 through 4.

Referring to FIGS. 1 through 4, the multilayer capacitor, according to the exemplary embodiment, may include a capacitor body 110, an amorphous dielectric film 113, and first and second external electrodes 131 and 132.

A shape of the capacitor body 110 is not particularly limited, but may be hexahedral, as illustrated in FIG. 2. Due to sintering shrinkage of a dielectric powder at the time of sintering a chip, the capacitor body 110 may not have a perfect hexahedral shape, but may have a substantially hexahedral shape. Thus, the capacitor body 110 may have first and second surfaces S1 and S2 opposing each other in the length direction, third and fourth surfaces S3 and S4 connected to the first and second surfaces S1 and S2 and opposing each other in the width direction, and fifth and sixth surfaces S5 and S6 connected to the first and second surfaces S1 and S2 and opposing each other in the thickness direction.

The capacitor body 110 may include dielectric layers 112 and first and second internal electrodes 121 and 122 alternately disposed with the dielectric layers 112 interposed therebetween, and exposed to the first and second surfaces S1 and S2, respectively. The dielectric layers 112, forming the capacitor body 110, may be in a sintered state, and may be integrated to the extent that it may be difficult to identify borders between the dielectric layers 112 without using a scanning electron microscope (SEM).

The dielectric layers 112 may include a high-k crystalline ceramic powder, for example, a barium titanate ($BaTiO_3$)-based powder, a lead-composite perovskite powder, or a strontium titanate ($SrTiO_3$)-based powder, preferably, a barium titanate ($BaTiO_3$)-based powder. However, the present disclosure is not limited thereto. In addition, at least one of a ceramic additive, an organic solvent, a plasticizer, a binder, a dispersant, and the like, may be further added to the dielectric layers 112, together with the crystalline ceramic powder.

At least one of the fifth and sixth surfaces S5 and S6 of the capacitor body 110 may have a cover region in which an internal electrode pattern is not formed. Such a cover region may be formed by stacking a single or two or more dielectric layers having no electrode pattern to form an uppermost and/or lowermost portion of the capacitor body 110, and may basically serve to prevent the first and second internal electrodes 121 and 122 from being damaged by physical or chemical stress.

The first and second internal electrodes 121 and 122 may have different polarities, may be alternately disposed in the capacitor body 110 in the thickness direction with the dielectric layers 112 interposed therebetween, and may be exposed to the first and second surfaces S1 and S2 of the capacitor body 110, respectively.

The first and second internal electrodes 121 and 122 may be formed by printing a conductive paste that may have a certain thickness and include a conductive metal on the dielectric layers 112, and may be electrically insulated from each other by the dielectric layers 112 disposed between the first and second internal electrodes 121 and 122.

Examples of the conductive metal may include nickel (Ni), copper (Cu), palladium (Pd), or alloys thereof, but the present disclosure is not limited thereto.

Further, as a method for printing the conductive paste, a screen printing method, a gravure printing method, or the like, may be used, but the present disclosure is not limited thereto.

An overlapping area of the first and second internal electrodes 121 and 122 in the thickness direction may be involved in the formation of capacity in the multilayer capacitor, and as the area increases, capacitor capacity may increase correspondingly. As can be seen in FIG. 2, because the multilayer capacitor, according to an exemplary embodiment, may include the first and second internal electrodes 121 and 122 each formed entirely in the width direction of the dielectric layers 112, the overlapping area of the first and second internal electrodes 121 and 122 may be significantly increased, thus obtaining high capacity, as compared to a volume of the multilayer capacitor.

The amorphous dielectric film 113 may be formed on at least the third and fourth surfaces S3 and S4 of the capacitor body 110 to prevent the first and second internal electrodes 121 and 122 from being exposed externally, thus achieving electrical insulation, and to avoid moisture from permeating into the capacitor body 110, thus contributing to improving moisture resistance reliability of the multilayer capacitor.

In general, a crystalline dielectric may be used as a dielectric forming the multilayer capacitor to ensure a high dielectric constant. Such a crystalline dielectric may have a low degree of electrical insulation due to poor withstand voltage characteristics. Thus, in an exemplary embodiment, electrical insulation of the first and second internal electrodes 121 and 122 may be achieved using the amorphous dielectric film 113. As a result, the amorphous dielectric film 113, having a significantly reduced thickness, may electrically insulate the first and second internal electrodes 121 and 122 from each other.

The amorphous dielectric film 113 may be formed on a region in which the first and second external electrodes 131 and 132 are not formed in the capacitor body 110, but the present disclosure is not limited thereto.

For example, a material, having excellent moisture resistance, may be selected as a dielectric material forming the amorphous dielectric film 113. Examples of the dielectric material may include $Al_2O_3$, $Si_3N_4$, $SiO_2$, and parylene. Here, when moisture resistance is poor, the amorphous dielectric film 113 may be required to have an increased thickness to ensure reliability. In this case, it may be difficult to significantly increase the overlapping area of the first and second internal electrodes 121 and 122.

However, as mentioned above, in the case of a conventional sheet transfer method, because a dielectric sheet is subjected to a sintering process after being transferred, a dielectric layer and the dielectric sheet may be required to be formed of the same dielectric. Accordingly, it was difficult to increase capacity in the multilayer capacitor and ensure moisture resistance reliability simultaneously.

Conversely, in an exemplary embodiment, as described below, because the amorphous dielectric film 113 is formed using a deposition process including, but not limited to, chemical vapor deposition (CVD), plasma-enhanced chemical vapor deposition (PECVD), Low-pressure chemical vapor deposition (LPCVD), atomic layer deposition (ALD), or molecular vapor deposition (MVD), a type of dielectric included in the amorphous dielectric film 113 is not limited, and because the amorphous dielectric film 113 may be ultra thin, the multilayer capacitor may have increased capacity therein and ensure moisture resistance reliability simultaneously.

According to an unlimited exemplary embodiment, the amorphous dielectric film 113 may have a significantly increased thickness d of 5 μm or less (excluding 0 μm), more preferably, 5 μm or less, (excluding 0 μm). When the significantly increased thickness d of the amorphous dielectric film 113 exceeds 5 μm, internal stress of the amorphous dielectric film 113 may cause the amorphous dielectric film 113 to be unstable.

The first and second external electrodes 131 and 132 may be formed on the first and second surfaces S1 and S2 of the capacitor body 110, respectively, and may be connected to the first and second internal electrodes 121 and 122, respectively, exposed to the first and second surfaces S1 and S2.

The first and second external electrodes 131 and 132 may be formed of a conductive paste that includes a conductive metal.

Examples of the conductive metal may include nickel (Ni), copper (Cu), palladium (Pd), and alloys thereof, but the present disclosure is not limited thereto.

A method for manufacturing a multilayer capacitor according to another aspect in the present disclosure will be described hereinafter in detail.

FIGS. 5 through 13 are schematic views of an example of a process of manufacturing a multilayer capacitor according to an exemplary embodiment.

Figure 5:
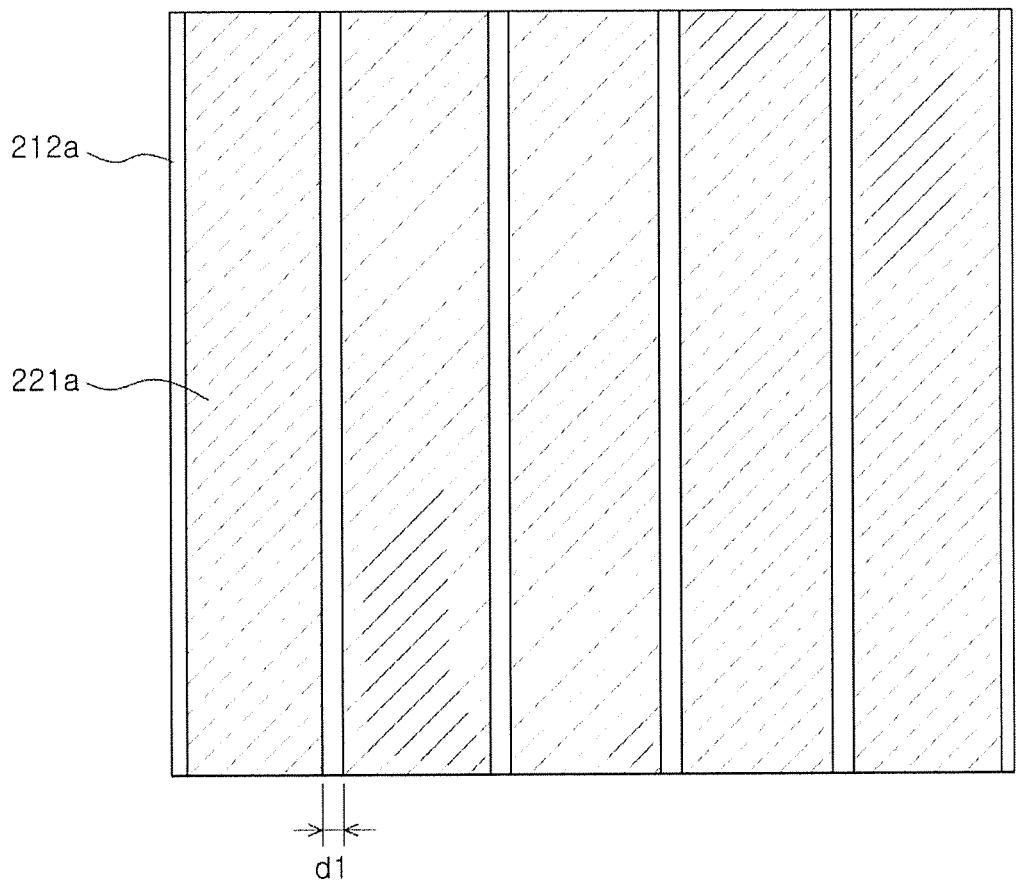
FIGS. 5 through 13 are schematic views of an example of a process of manufacturing a multilayer capacitor according to an exemplary embodiment.

First, as illustrated in FIG. 5, a plurality of stripe-type first internal electrode patterns 221a may be formed on a ceramic green sheet 212a at predetermined intervals d1. In an exemplary embodiment, the stripe-type first internal electrode patterns 221a may be parallel to each other. The predetermined intervals d1 may each correspond to twice a distance at which an internal electrode may be insulated from an external electrode plus a cutting width required by a cutting process, having a polarity different from that of the internal electrode.

The ceramic green sheet 212a may be formed of a ceramic paste that includes a crystalline ceramic powder, an organic solvent, and an organic binder. The crystalline ceramic powder may be a high-k material, and examples of the crystalline ceramic powder may include a barium titanate ($BaTiO_3$)-based powder, a lead-composite perovskite powder, or a strontium titanate ($SrTiO_3$)-based powder, preferably, a barium titanate ($BaTiO_3$)-based powder. However, the present disclosure is not limited thereto. The ceramic green sheet 212a may be formed as a dielectric layer, forming the capacitor body 110, by being sintered.

The stripe-type first internal electrode patterns 221a may be formed of an internal electrode paste that includes a conductive metal. Examples of the conductive metal may include nickel (Ni), copper (Cu), palladium (Pd), or alloys thereof, and the conductive metal is not limited thereto.

A method for forming the stripe-type first internal electrode patterns 221a on the ceramic green sheet 212a is not particularly limited. For example, a screen printing method or a gravure printing method may be used.

Further, although not illustrated, a plurality of stripe-type second internal electrode patterns 222a may be formed on another ceramic green sheet 212a at predetermined intervals.

Hereinafter, the ceramic green sheet 212a, having the stripe-type first internal electrode patterns 221a formed thereon, may be referred to as a first ceramic green sheet, and the ceramic green sheet 212a, having the stripe-type second internal electrode patterns 222a formed thereon, may be referred to as a second ceramic green sheet.

Figure 6:
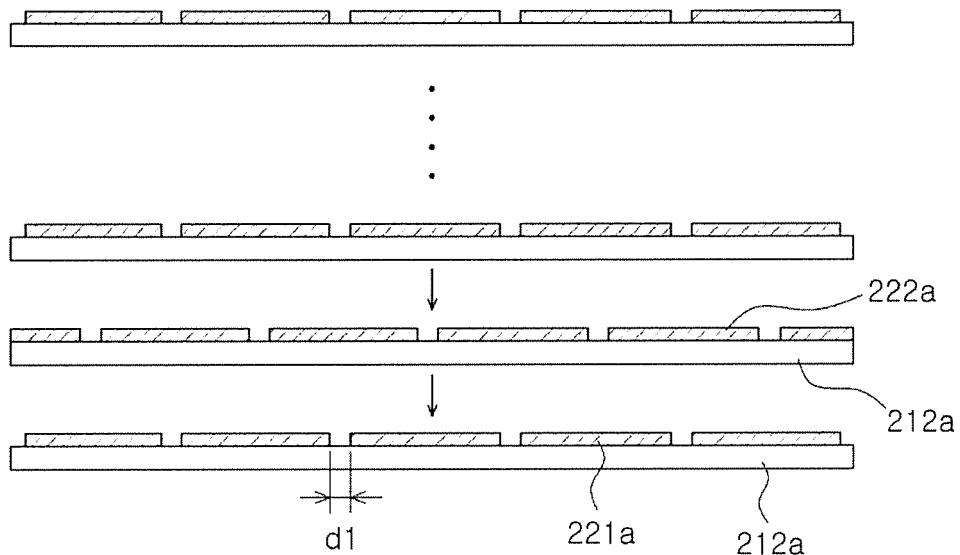

Subsequently, as illustrated in FIG. 6, a ceramic green sheet laminate 211a may be formed by alternately stacking the first and second ceramic green sheets such that the stripe-type first internal electrode patterns 221a and the stripe-type second internal electrode patterns 222a may alternate with each other. The stripe-type first internal electrode patterns 221a may form a first internal electrode 121, and the stripe-type second internal electrode patterns 222a may form a second internal electrode 122.

Although not illustrated, at least one of upper and lower surfaces of the ceramic green sheet laminate 211a may have a cover region in which a plurality of ceramic green sheets, each having no internal electrode pattern, are stacked.

Figure 7:
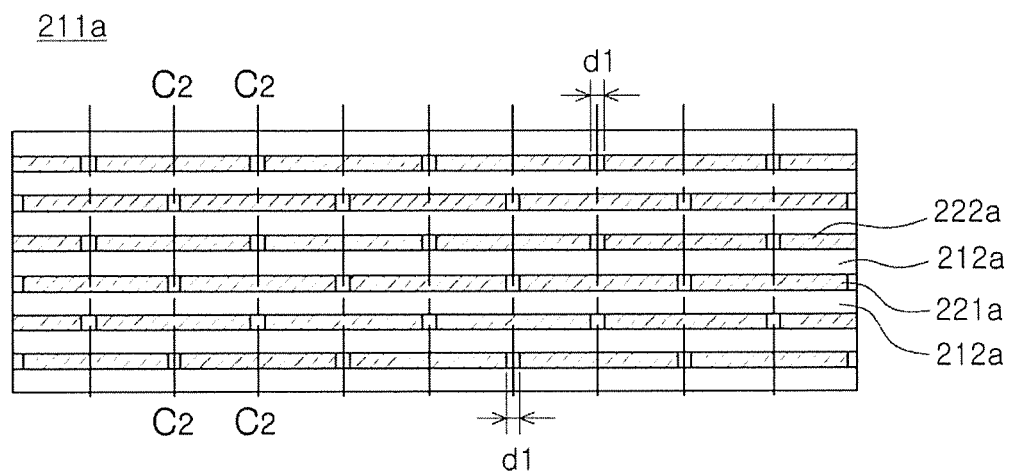
Figure 8:
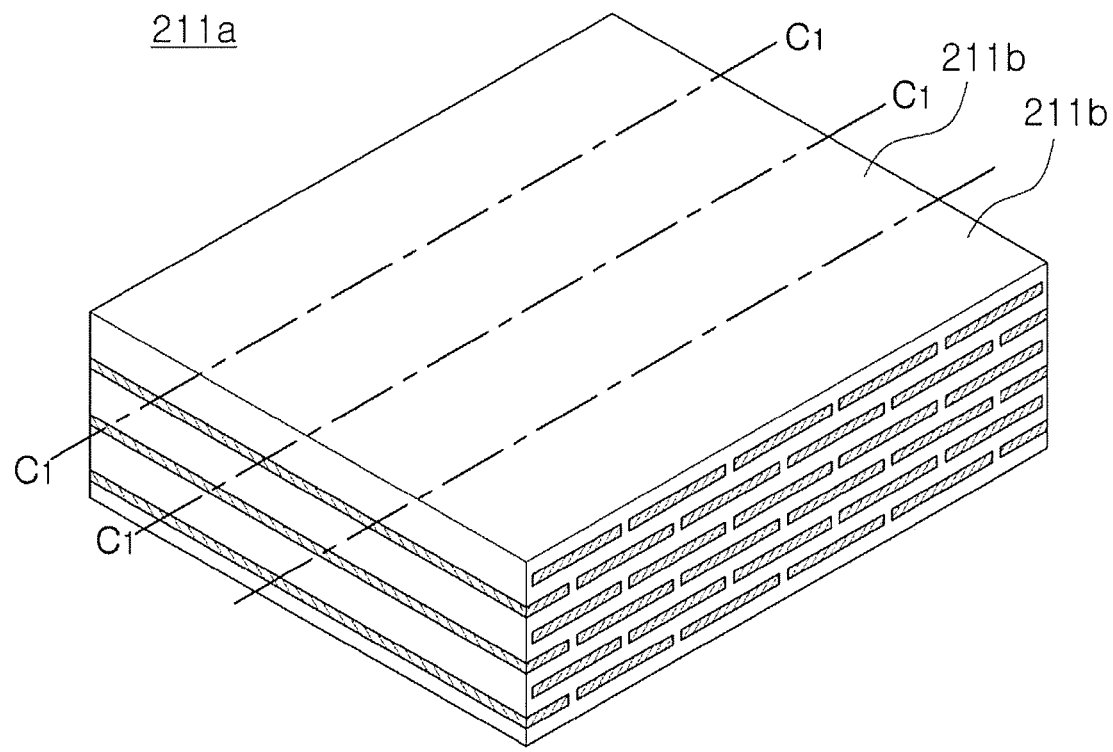

FIG. 7 is a cross-sectional view of the ceramic green sheet laminate 211a having the first and second ceramic green sheets stacked therein. FIG. 8 illustrates a perspective view of the ceramic green sheet laminate 211a having the first and second ceramic green sheets stacked therein.

Referring to FIGS. 7 and 8, the first ceramic green sheet printed with a plurality of parallel stripe-type first internal electrode patterns 221a and the second ceramic green sheet printed with a plurality of parallel stripe-type second internal electrode patterns 222a may be alternately stacked with each other.

The stripe-type first internal electrode patterns 221a and the stripe-type second internal electrode patterns 222a may be stacked, such that a center of each of the stripe-type first internal electrode patterns 221a in the width direction may overlap a center of a predetermined interval between the stripe-type second internal electrode patterns 222a in the width direction.

Subsequently, as illustrated in FIG. 8, the ceramic green sheet laminate 211a may be cut in a direction perpendicular to a formation direction of the first and second internal electrode patterns 221a and 222a. For example, the ceramic green sheet laminate 211a may be cut into a bar-type laminate 211b along a C1-C1 cutting line.

In more detail, the stripe-type first internal electrode patterns 221a and the stripe-type second internal electrode patterns 222a may be cut, in the length direction, into a plurality of internal electrodes having a predetermined width. Here, the first and second ceramic green sheets may be cut together with the stripe-type first internal electrode patterns 221a and the stripe-type second internal electrode patterns 222a. Accordingly, dielectric layers may have the same width as first and second internal electrodes.

In this case, the first and second internal electrodes may be exposed to cut surfaces of the bar-type laminate 211b, and the cut surfaces of the bar-type laminate 211b may be referred to as third and fourth surfaces of the bar-type laminate 211b.

Figure 9:
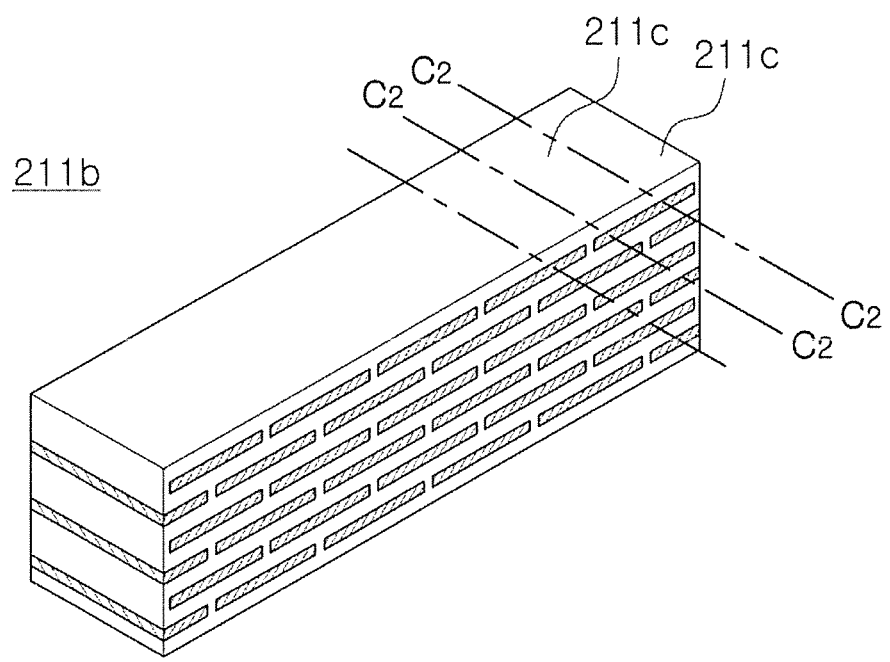

Subsequently, as illustrated in FIG. 9, the bar-type laminate 211b may be cut in a direction parallel to a formation direction of the first and second internal electrodes. For example, the bar-type laminate 211b may be cut along a C2-C2 cutting line, to have a width suitable for a separate chip, to obtain a separate laminate 211c.

In more detail, the C2-C2 cutting line may penetrate through the center of each of the stripe-type first internal electrode patterns 221a, printed on the first ceramic green sheet, in the width direction and the center of the predetermined interval between the stripe-type second internal electrode patterns 222a, printed on the second ceramic green sheet, in the width direction. Accordingly, the separate laminate 211c may have first and second surfaces to which one ends of the first and second internal electrodes are respectively exposed.

Figure 10:
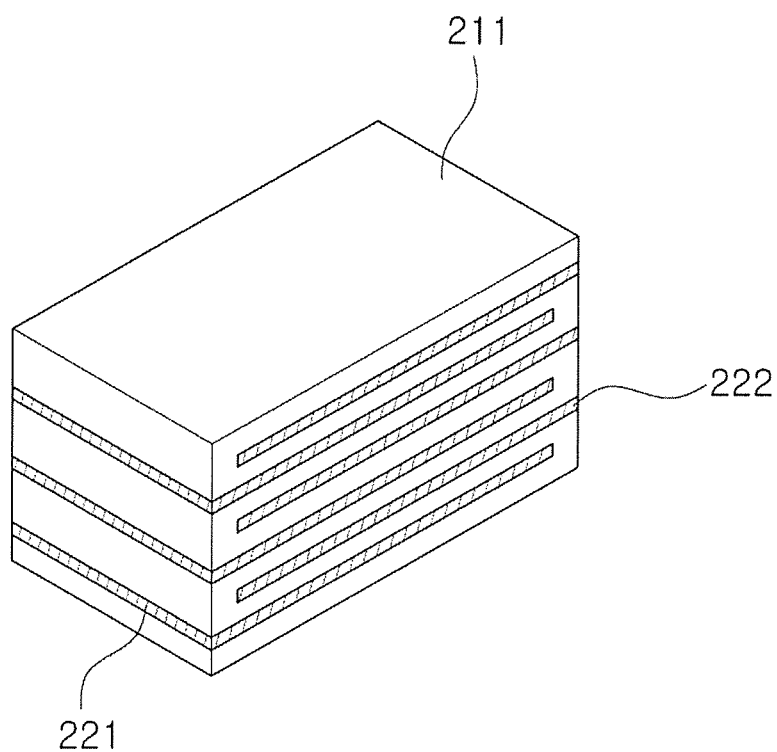

Subsequently, as illustrated in FIG. 10, a capacitor body 211 may be formed by sintering the separate laminate 211c.

The sintering may be performed under an $N_2$—$H_2$ atmosphere of 1,100° C. to 1,300° C. However, the present disclosure is not limited thereto.

Figure 11:
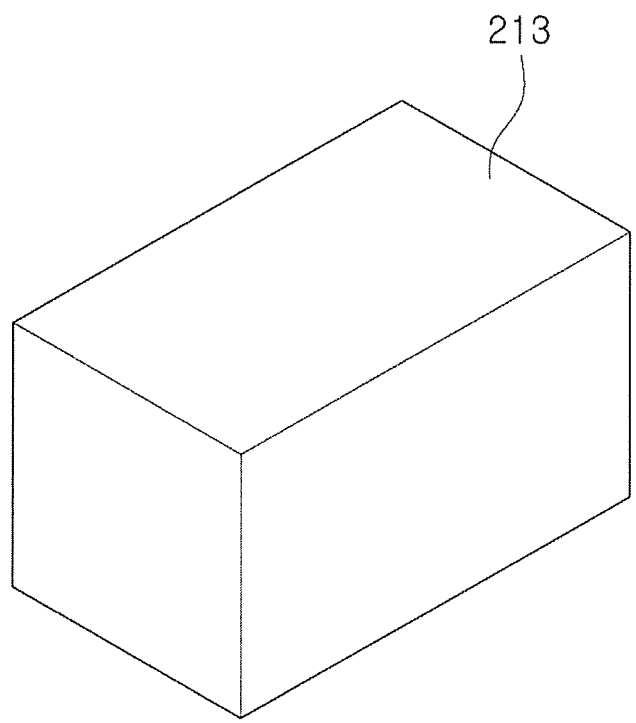

Subsequently, as illustrated in FIG. 11, an amorphous dielectric film 213 may be formed on a surface of the capacitor body 211. The amorphous dielectric film 213 may be formed using a deposition process including, but not limited to, chemical vapor deposition (CVD), plasma-enhanced chemical vapor deposition (PECVD), Low-pressure chemical vapor deposition (LPCVD), or atomic layer deposition (ALD). In this case, as described above, because a type of dielectric included in the amorphous dielectric film 213 is not limited and the amorphous dielectric film 213 may be ultra thin, the multilayer capacitor may have increased capacity therein and ensure moisture resistance reliability, simultaneously.

The amorphous dielectric film 213 may include at least one dielectric selected from the group consisting of $Al_2O_3$, $Si_3N_4$, $SiO_2$, and parylene. Accordingly, capacity in the multilayer capacitor may be increased while ensuring moisture resistance reliability.

Figure 12:
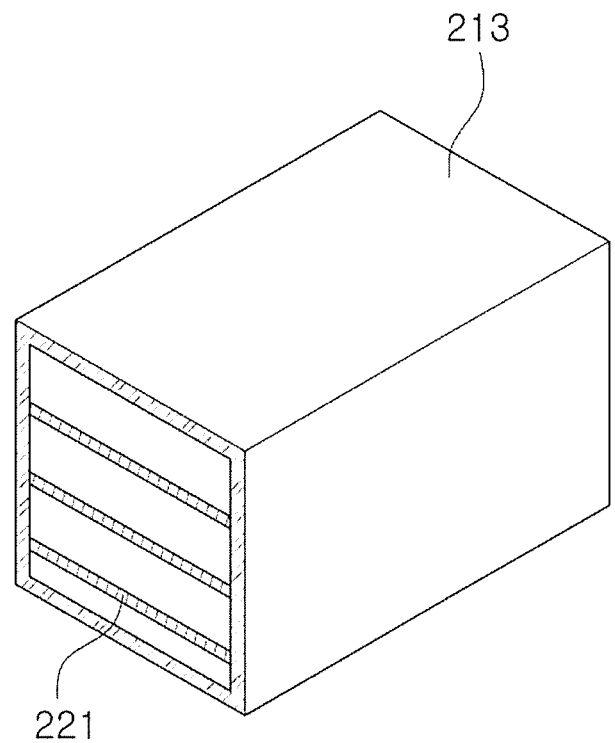

Subsequently, as illustrated in FIG. 12, the amorphous dielectric film 213 formed on first and second surfaces of the capacitor body 211 may be removed. The removing may be performed to form first and second external electrodes, as described below. A detailed method for removing the amorphous dielectric film 213 is not particularly limited. According to an unlimited exemplary embodiment, a wet etching or sandblasting treatment may be used.

Figure 13:
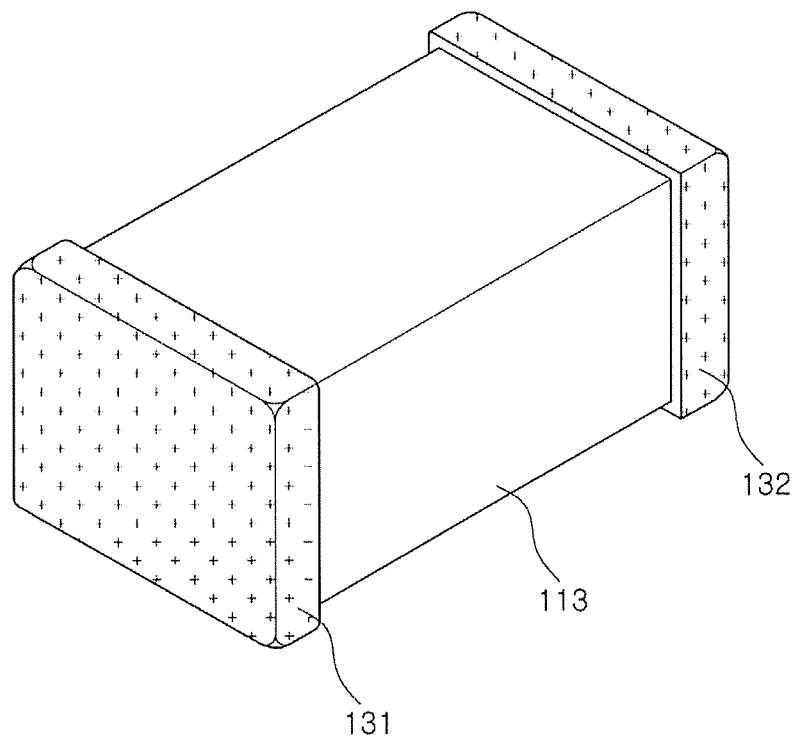

Subsequently, as illustrated in FIG. 13, first and second external electrodes 231 and 232 may respectively be formed on the first and second surfaces of the capacitor body 211. The first and second external electrodes 231 and 232 may be electrically connected to the first and second internal electrodes, respectively.

The first and second external electrodes 231 and 232 may be formed of a conductive paste that includes a conductive metal. Examples of the conductive metal may include nickel (Ni), copper (Cu), palladium (Pd), or alloys thereof, but the present disclosure is not limited thereto.

As set forth above, according to the exemplary embodiments, a multilayer capacitor may have a high capacitor capacity due to a high effective volume ratio.

Further, the multilayer capacitor may have excellent moisture resistance reliability.

While exemplary embodiments have been shown and described above, it will be apparent to those skilled in the art that modifications and variations could be made without departing from the scope of the present disclosure, as defined by the appended claims.

What is claimed is:

1. A multilayer capacitor, comprising:
a capacitor body having a first surface and a second surface opposing each other, a third surface and a fourth surface opposing each other while being connected to the first surface and the second surface, and a fifth surface and a sixth surface opposing each other while being connected to the first to fourth surfaces, and the capacitor body including dielectric layers and a first internal electrode and a second internal electrode disposed alternately with the dielectric layers interposed therebetween, the first internal electrode and the second internal electrode being exposed to the first and second surfaces, respectively; and
an amorphous dielectric film disposed directly on only an entirety of each of the third to sixth surfaces among the first to sixth surfaces, the amorphous dielectric film being in direct contact with the first and second internal electrodes exposed from the third and fourth surfaces, wherein the amorphous dielectric film includes at least one dielectric selected from the group consisting of $Al_2O_3$, parylene, and combinations thereof, and the amorphous dielectric film has a uniform thickness of 5 μm or less but greater than 0 μm.

2. The multilayer capacitor of claim 1, wherein the amorphous dielectric film is formed using a deposition process.

3. The multilayer capacitor of claim 2, wherein the deposition process includes any one of chemical vapor deposition (CVD), atomic layer deposition (ALD), and molecular vapor deposition (MVD).

4. The multilayer capacitor of claim 1, further comprising: first and second external electrodes disposed on the first and second surfaces of the capacitor body, respectively, and being electrically connected to the first and second internal electrodes exposed to the first and second surfaces, respectively.

5. The multilayer capacitor of claim 1, wherein the amorphous dielectric layer and the dielectric layers of the capacitor body are composed of different materials.

6. The multilayer capacitor of claim 1, wherein the dielectric layers of the capacitor body include a high-k crystalline ceramic powder selected from the group consisting of a barium titanate ($BaTiO_3$)-based powder, a lead-composite perovskite powder, and a strontium titanate ($SrTiO_3$)-based powder.

7. A multilayer capacitor, comprising:

a capacitor body having a first surface and a second surface opposing each other, a third surface and a fourth surface opposing each other while being connected to the first surface and the second surface, and a fifth surface and a sixth surface opposing each other while being connected to the first to fourth surfaces, and the capacitor body including dielectric layers and a first internal electrode and a second internal electrode disposed alternately with the dielectric layers interposed therebetween, the first internal electrode and the second internal electrode being exposed to the first and second surfaces, respectively;

first and second external electrodes disposed on the first and second surfaces of the capacitor body, respectively, and being electrically connected to the first and second internal electrodes exposed to the first and second surfaces, respectively; and an amorphous dielectric film disposed directly on only an entirety of each of the third to sixth surfaces among the first to sixth surfaces and, the amorphous dielectric film being in direct contact with the first and second internal electrodes, wherein the amorphous dielectric layer and the dielectric layers of the capacitor body are composed of different materials, the amorphous dielectric film includes at least one dielectric selected from the group consisting of $Al_2O_3$, parylene, and combinations thereof, and the amorphous dielectric film has a uniform thickness of 5 μm or less but greater than 0 μm.

8. The multilayer capacitor of claim 7, wherein the dielectric layers of the capacitor body include a high-k crystalline ceramic powder selected from the group consisting of a barium titanate ($BaTiO_3$)-based powder, a lead-composite perovskite powder, and a strontium titanate ($SrTiO_3$)-based powder.

* * * * *